US010145406B2

(12) United States Patent
Marc

(10) Patent No.: US 10,145,406 B2
(45) Date of Patent: *Dec. 4, 2018

(54) SELF-LOCKING SCREWING ATTACHMENT DEVICES AND ASSEMBLIES PROVIDED WITH SAME

(71) Applicant: JPB Systeme, Montereau sur le Jard (FR)

(72) Inventor: Damien Marc, Nangis (FR)

(73) Assignee: JPB Système, Montereau sur le Jard (FR)

( * ) Notice: Subject to any disclaimer, the term of this patent is extended or adjusted under 35 U.S.C. 154(b) by 356 days.

This patent is subject to a terminal disclaimer.

(21) Appl. No.: 14/743,328

(22) Filed: Jun. 18, 2015

(65) Prior Publication Data
US 2015/0330436 A1 Nov. 19, 2015

Related U.S. Application Data

(63) Continuation-in-part of application No. 14/492,830, filed on Sep. 22, 2014, which is a continuation-in-part of application No. 13/505,922, filed as application No. PCT/FR2010/052358 on Nov. 3, 2010, now Pat. No. 8,840,348.

(30) Foreign Application Priority Data

Nov. 5, 2009 (FR) ...................... 09 57838

(51) Int. Cl.
F16B 39/32 (2006.01)
F16B 39/26 (2006.01)
F16B 39/282 (2006.01)

(52) U.S. Cl.
CPC ............ *F16B 39/26* (2013.01); *F16B 39/282* (2013.01)

(58) Field of Classification Search
CPC ....................................... F16B 39/24
USPC ............................................. 411/128
See application file for complete search history.

(56) References Cited

U.S. PATENT DOCUMENTS

| 1,402,902 | A | * | 1/1922 | Sherwin | ................. | A01K 1/062 |
| | | | | | | 119/746 |
| 1,646,805 | A | | 10/1927 | Bell | | |
| 5,851,035 | A | | 12/1998 | Marc et al. | | |
| 5,897,277 | A | | 4/1999 | Barre et al. | | |
| 9,574,599 | B2 | * | 2/2017 | Marc | .................... | F01D 21/003 |
| 2006/0151994 | A1 | | 7/2006 | Marc et al. | | |

FOREIGN PATENT DOCUMENTS

CH 29609 A 9/1904

OTHER PUBLICATIONS

European Patent Office; Search Report in International Patent Application No. PCT/FR2010/052358 dated Mar. 17, 2011; 4 pages.
French Patent Office; Search Report in French Patent Application No. 0957838 dated Jul. 8, 2010; 2 pages.

* cited by examiner

Primary Examiner — Gary W Estremsky
(74) Attorney, Agent, or Firm — Dorton & Willis, LLP

(57) ABSTRACT

A self-locking screwing attachment device. In one embodiment, the device includes a first element having an inner thread, the first element being screwed onto a threaded tip. In other embodiments, the first element has an outer thread and can either be made of a hollow body or have a closed end so as to constitute, for instance, a borescope.

29 Claims, 4 Drawing Sheets

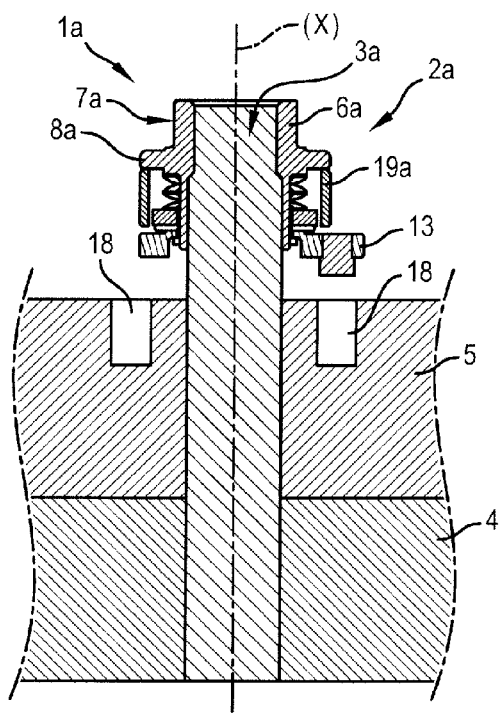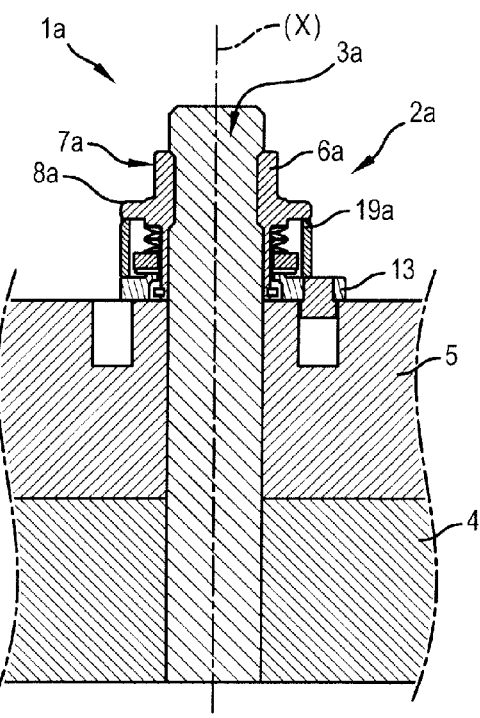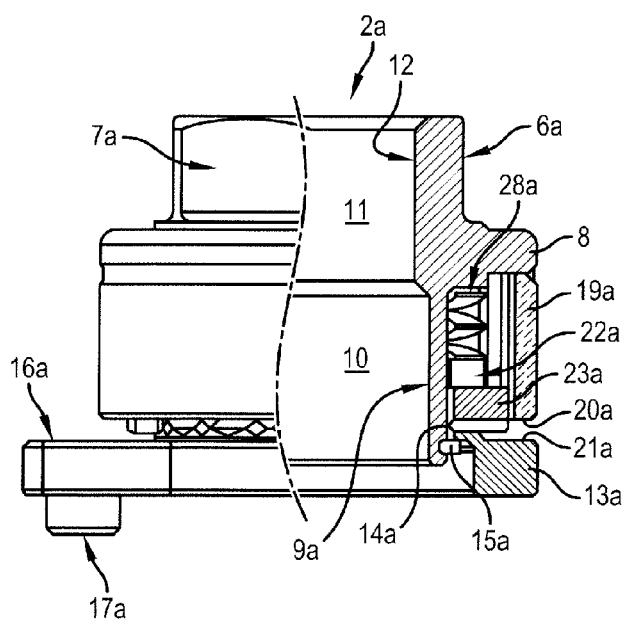

SELF-LOCKING SCREWING ATTACHMENT DEVICES AND ASSEMBLIES PROVIDED WITH SAME

CROSS-REFERENCE

This application is a Continuation-In-Part of U.S. patent application Ser. No. 14/492,830, filed Sep. 22, 2014 (Pending), which is a Continuation-In-Part of U.S. patent application Ser. No. 13/505,922, filed May 3, 2012 (now U.S. Pat. No. 8,840,348), which is the National Stage of International Patent Application No. PCT/FR2010/052358 filed Nov. 3, 2010 (Expired), which claims the benefit of priority to French Application No. FR 09 57838, filed Nov. 5, 2009 (now French Patent No. 2,952,149), the disclosures of which are expressly incorporated by reference herein in their entirety.

TECHNICAL FIELD

The present invention relates to a self-locking screwing attachment device. In one embodiment, the device includes a nut screwed onto a threaded tip. In another embodiment, the device includes a screw which is screwed into a threaded bore. In a third embodiment, the device is a plug having a male thread, typically a borescope plug.

The present invention also relates to an assembly of at least two parts attached to each other by such a device.

The self-locking attachment device has the object to prevent two parts from being importunately unscrewed with respect to each other, in particular in applications where both pieces are subjected when operated to vibrations or shakes. This is applicable to an assembly of three or more parts.

BACKGROUND

Self-locking screwing attachment devices for securing at least two parts to each other, having generally the form of a nut screwed onto a threaded tip, provided with reinforced releasable coupling means, for preventing said at least two parts from being importunately unscrewed, are known. This reinforced coupling means performs a self-locking of the coupling when screwing the nut on the tip.

These known devices generally have drawbacks of several kinds:
  the device consists of several separable parts which can be lost and should be assembled according to an accurate order,
  nut of such device is not adapted to parts to be assembled and/or to threaded tips having multiple shapes and is not necessarily standard; the friction surfaces required for the clamping are highly dependent on the shape of parts to be assembled, resulting in an uncertain clamping efficiency according to configurations; the adaption of these known nuts sometimes requires a significant and extensive machining,
  poorly optimized dimensions.

PURPOSE OF THE INVENTION

The purpose of the invention is to overcome all or part of the previous drawbacks by providing a self-locking screwing attachment device for attaching at least two parts to each other, which is compact, made as a single piece, adaptable to configurations and shapes of multiple non-standard parts, or demanding as little machining as possible.

OBJECT(S) OF THE INVENTION

For that purpose, one object of the invention is to provide a unitary self-locking screwing attachment device for being part of an assembly having locking structure and for engaging a threaded member of said assembly, the attachment device comprising:
  a first element having a threaded body for thread engagement with said threaded member during screwing and unscrewing towards and away from a tightened condition, respectively; and
  a lock in turn comprising:
    a second element rotatably and captively supported onto said threaded body and provided with at least one locking feature to engage said locking structure and to form with the locking structure a self-hooking set, at least when said assembly is in or close to the tightened condition;
    a stop member rotatably secured to the threaded body;
    a releasable coupling means arranged for releasably coupling the stop member and the second element for common rotation;
    spring means for resiliently activating said releasable coupling means;
wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold.

In an embodiment, said locking structure has a shape which is at least partially conjugated with a shape of said at least one locking feature.

Typically, said at least one locking feature comprises at least one projection sized and shaped to be received into at least one recess of said locking structure.

Preferably, said at least one projection comprises an at least partially cylindrical body.

In an embodiment, said at least one projection comprises a radially elongated protrusion relative to the screwing or unscrewing direction.

Preferably, said at least one projection comprises a tangentially elongated protrusion relative to the screwing or unscrewing direction.

The at least one locking feature preferably comprises at least one recess sized and shaped to receive a projection of said locking structure.

Typically, said at least one recess consists of two diametrically opposed recesses.

When the at least one locking feature comprises at least one recess, said at least one recess consists of at least one notch disposed on the periphery of said second element.

Preferably, said notch comprises an axial protrusion having a tangentially increasing or decreasing size.

Said at least one locking feature is preferably disposed on a radially overhanging element shaped on the second element.

In an embodiment, said unitary self-locking screwing attachment device is a nut.

In another embodiment, said unitary self-locking screwing attachment device is a screw.

In another embodiment, said unitary self-locking screwing attachment device is a plug having a male thread intended to be screwed into a bore for removably closing said bore.

Preferably, said plug is a borescope plug.

According to a second object of this invention, there is provided an assembly comprising:
- a sub-assembly having locking structure,
- a unitary self-locking screwing attachment device for engaging a threaded member of said sub-assembly, the attachment device comprising:
  - a first element having a threaded body for thread engagement with said threaded member during screwing and unscrewing towards and away from a tightened condition, respectively; and
  - a lock in turn comprising:
    - a second element rotatably and captively supported onto said threaded body and provided with at least one locking feature to engage said locking structure and to form with the locking structure a self-hooking set, at least when said assembly is in or close to the tightened condition;
    - a stop member rotatably secured to the threaded body;
    - a releasable coupling means arranged for releasably coupling the stop member and the second element for common rotation;
    - spring means for resiliently activating said releasable coupling means;

wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold.

In an embodiment, said locking structure and said at least one locking feature have a conjugated shape, at least partially.

Typically, at least one of said locking structure and said locking feature comprises at least one recess, and the other of said locking structure and said locking feature comprises at least one projection sized and shaped to be received into the at least one recess.

Typically, said at least one recess consists of two diametrically opposed recesses Preferably, said at least one projection comprises an at least partially cylindrical body.

In an embodiment, said at least one projection comprises a radially protrusion relative to the screwing or unscrewing direction.

Preferably, said at least one projection comprises a tangentially elongated protrusion relative to the screwing or unscrewing direction.

Preferably, said at least one recess consists of at least one notch disposed on the periphery of said assembly or said second element.

When the at least one recess consists of at least one notch, said notch comprises an axial protrusion having a tangentially increasing or decreasing size.

In an embodiment, said at least one locking feature is disposed on a radially overhanging element shaped on the second element.

Preferably, said assembly comprises a threaded shank and said unitary self-locking screwing attachment device is a nut.

In another embodiment, said assembly comprises a threaded bore and said unitary self-locking screwing attachment device is a screw.

In another embodiment, said assembly comprises a threaded bore and said unitary self-locking screwing attachment device is a plug adapted to removably close said threaded bore.

Preferably, said bore is a borescope.

BRIEF DESCRIPTION OF THE DRAWINGS

The invention will be better understood upon reading the description that follows of two non-limiting embodiments of the invention and in light of the appended drawings wherein:

FIGS. 1 and 2 represent an assembly comprising a self-locking screwing attachment device being generally a nut, and a sub-assembly having a threaded shank for receiving the nut, according to a first embodiment of the invention, respectively in a preassembled configuration and in an assembled configuration;

FIG. 3 represents an enlarged view of FIG. 1 with a partial cross-section along a longitudinal cross-section plane;

DETAILED DESCRIPTION

Figure 4:
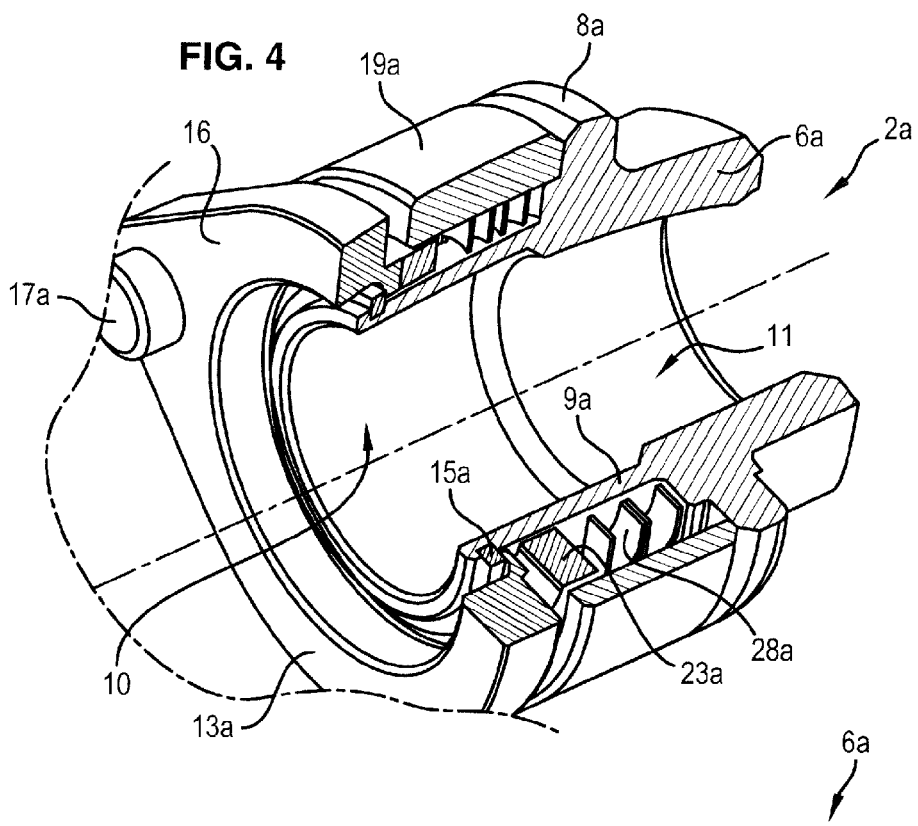
FIG. 4 represents a perspective view of the nut of FIG. 1 with one quarter cut away in the longitudinal direction.

The following description is firstly referring to the assembly represented in FIGS. 1-6, and is concerning an embodiment in which the assembly comprises a self-locking screwing attachment device being generally a nut, and a sub-assembly having a threaded shank for receiving the nut.

Generally in the following description, the screwing of the nut is mentioned along an axial direction X, which is coextensive to the longitudinal axis of the threaded tip cooperating with the nut. The words "front" and "back" used throughout the text to structurally describe the invention should be understood in connection with this axial direction, and more precisely with the direction of movement of the nut when it is screwed onto the tip (screwing forwardly, unscrewing rearwardly).

There is represented in FIGS. 1 and 2 a self-locking screwing attachment device 1a according to a first embodiment of the invention. This device includes a nut 2a screwed onto a threaded tip 3a (or strut) so as to ensure the attachment to each other of at least two parts, typically a supporting part 4 and an adjacent part 5, in the example represented. In this example, the threaded tip 3a is rigidly mounted in a bore of the supporting part 4. The adjacent part 5 has the tip 3a passing therethrough and is sandwiched between the supporting part 4 and the nut 2a. In an alternative not represented, the tip 3a can be provided with a shoulder resting against a face of the supporting part 4 on the opposite side to the thread of the tip 3a, so as to simultaneously sandwich the supporting part 4 and the adjacent part 5 between the shoulder and the nut 2a.

According to the invention, the nut 2a includes a first element 6a rotating relative to the tip 3a when screwing. In reference to FIGS. 1 to 3, this first element includes several sections that can be broken down from back to front into an area for rotatable engagement 7a by a screwing tool such as a wrench, a shoulder 8a formed on the periphery of the nut 2a, and a cylindrical part 9a, substantially extending the area for rotatable engagement 7a forwardly beyond the shoulder 8a. The area 7a has typically a prismatic external shape, for example a six-sided one. The first element includes an end-to-end through bore 10. A rear part 11 of the bore 10 is narrower and includes a thread 12 cooperating with that of the tip 3a when screwing.

The nut 2a includes a second element 13a having generally an annular shape located at a front end of the nut 2a. The second element 13a includes an internal shoulder 14a. The radially internal profile of the shoulder 14a is fitted around a front end of the cylindrical part 9a of the first element 6a and is retained forwardly by an axial stop 15a, typically an elastic ring.

Figure 5:
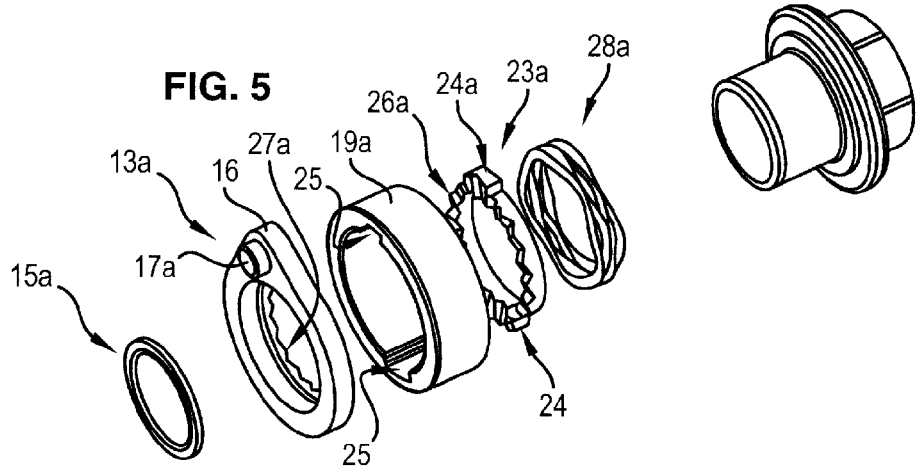
FIG. 5 represents an exploded view of the nut of FIG. 1.

As illustrated in FIG. 5, the second element 13a comprises a projection consisting in a lug 17a. This lug 17a is for being introduced into a recess 18 formed in the assembly (or adjacent part) 5 as represented in FIG. 1.

As soon as the lug 17a is introduced into the housing 18, the second element 13a is rotatably engaged with the adjacent part 5, that is rotatably unmovable with the same. It is assumed in this case that the part 5 is itself rotatably unmovable with respect to the tip 3a. The second element 13a includes a radial extension 16a carrying a lug 17a extending axially in the screwing direction of the nut 2a, that is forwardly. The lug 17a is for being introduced into a housing 18 having a conjugated shape, for example a blind bore provided in the adjacent part 5. In the example illustrated in FIGS. 1 and 2, there are provided two housings 18 arranged at 180° around the axis X, preventing the second element 13a from being rotated one full rotation about the axis X before the lug 17a is positioned opposite the housing 18. Alternatively, a single housing could be enough.

As can be seen in FIG. 3, the nut 2a also includes a supporting cylinder 19a fastened at its back end to a front face of the shoulder 8a. A face of the front end of the cylinder 19a makes up a first clamping surface 20a for axially engaging a second clamping surface 21a located in front of the same on a back face of the second element 13a. The supporting cylinder 19a forms a spacer restricting the advancement of the first element 6a with respect to the second element 13a when the nut 2a is being screwed onto the tip 3a. The cylinder 19a is for example welded to the shoulder 8a. A substantially annular or cylindrical throat 22a is provided between the cylindrical part 9a and the supporting cylinder 19a which bound this throat internally and externally, respectively.

The nut 2a also includes a stop member 23a having generally an annular shape introduced into the throat 20a. The stop member 23a is rotatably secured to the first element 6a. For that purpose, the stop member 23a includes at least one radial protrusion 24a, typically two protrusions 24a as represented in FIGS. 1 to 5. These protrusions 24a are introduced and axially slide in grooves 25 having conjugated shapes provided in the thickness of the supporting cylinder 19a (FIG. 5). These protrusions have for example dovetail shapes, the flared zone of which is the farthest from the axis X, these protrusions being introduced into respective grooves having also a trapezoidal cross-section. Such a trapezoidal shape ensures an optimum guidance of the stop member when axially moved into the throat 22a.

According to the invention, the nut 2a also includes releasable coupling means 26a, 27a, 28a consisting of two groups of axially directed teeth, fastened for a first group to the stop member 23a, and for the second group to the second element 13a. One group of teeth 26a is provided on a front annular face of the stop member 23a and another group of teeth 27a is provided on a back annular face of the second element 13a facing said front face. The teeth have a triangular configuration and have more precisely an isosceles shape, that is have faces directed towards the other group of teeth and are of the same oblique slope. The teeth 26a of the stop member 23a and the teeth 27A of the second element 13a have complementary profiles such that they are interpenetrable when biased by the return means 28a provided in the throat 22a, urging the stop member 23a towards the second element 13a.

The first group of teeth 26a of the stop member 23a is rotatably driven with the first element 6a upon screwing the nut 2a, whereas the second group of teeth 27a of the second element 13a is rotatably unmovable. During this relative rotation between both groups of teeth, the latter are alternately in an interpenetration configuration and a tip to tip configuration. The passage from one configuration to the other is performed by a relative sliding of the respective adjacent faces of both groups of teeth. The stop member 23a thereby performs translations along the axis X alternately rearwardly and forwardly when screwing the nut 2a, this being similar to an oscillation movement. Each translation is performed on a stroke corresponding to the height of the teeth, the distance separating the tip of one tooth from the trough between two teeth, projected on the axial direction.

Figure 6:
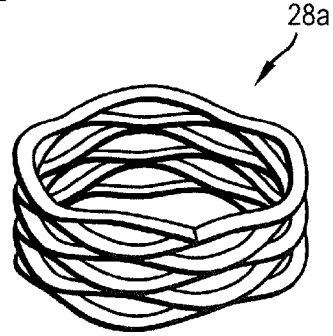
FIG. 6 represents a view of the spring integrated to the nut of FIG. 1.

The return means 28a are typically formed by a wavy compression spring, as illustrated in FIG. 6, working on a relatively small axial stroke, induced by alternated translations of the stop member 23a. The spring 28a rests on the one hand onto a shoulder of the first element 6a located at the bottom of the throat 22a, and on the other hand on a back face of the stop member 23a.

Screwing the nut 2a onto the tip 3a is performed the following way: as illustrated in FIG. 1, the nut is presented at the end of the threaded tip and then screwed thereto using an adapted wrench rotatably engaging the nut. At the beginning of the screwing, the second element is freely rotatable, and then moves closer to the adjacent part 5. When the nut 2a is being screwed, the second element 13a rotates about the axis X until the lug contacts the adjacent part 5. A further screwing of the nut further rotates the second element 13a, until the lug 17a clings onto the first of the housings 18 located on its trajectory, in view of the axial forward thrust. This indexing of the lug onto the mouth of the housing is automatically operated and generates a sensory effect perceived by the operator when screwing. The lug 17a once in this position, will then penetrate the housing 18 as the screwing proceeds further and the nut advances towards the adjacent part 5. The second element 13a is then rotatably unmovable with respect to the other parts of the nut 2a. Any further rotation of the first element 6a causes two effects: on the one hand, the first element 6a will advance in translation along the axis X towards the second element 13a, as long as there is nothing to stop this advancement. On the other hand, the coupling means are biased by the relative sliding between both groups of teeth 26a, 26b, which rotate with respect to each other at the same time as an oscillation of the stop member 23a is exerted against the thrust exerted by the return means 28a. Thrusts and releases are alternately performed in the contact between both groups of teeth. This results in a braking effect also called self-locking, preventing the nut 2a from being importunately unscrewed, since the same thrust and release phenomenon between the teeth is present when unlocking. To overcome the thrust of the spring, a rotation torque should be applied to the first element 6a, which is higher than a given threshold, so as to generate either locking, or unlocking.

The screwing proceeds until the second element 13a comes to press against the adjacent part 5 and the supporting cylinder 19a comes into contact with the second element 13a, by their respective clamping surface 20a, 21a, as shown in FIG. 2. A clamping torque is finally applied to the first element 6a, which is reflected by a suitable clamping directly exerted between the supporting cylinder 19a and the second element 13a.

The following description is referring to the assemblies represented in FIGS. 7 and 8, and is concerning alternative embodiments by comparison with the description hereinabove.

Figure 7:
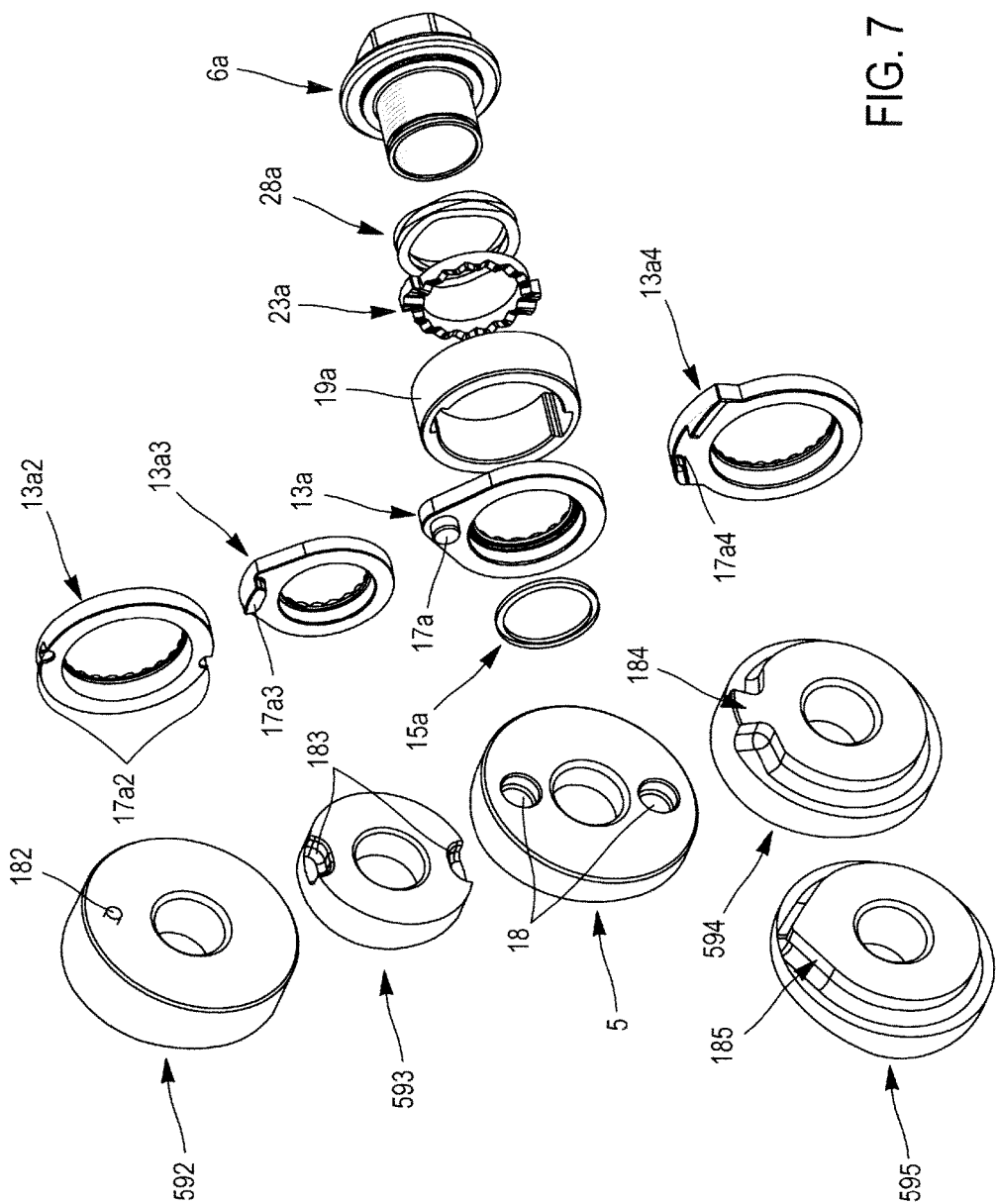
FIG. 7 is an exploded view of various embodiments of a device being a nut, with a part view of several corresponding embodiments of a sub-assembly.

In alternative embodiments, as illustrated in FIG. 7 (embodiment at the top), the anti-rotation protrusion is a projection 182 shaped on the adjacent part 592, and the recess 17a2 is formed in the second element 13a2. In this example, the second element 13a2 comprises two recesses 17a2 consisting in notches formed in the periphery and disposed on diametrically opposite sides of the second element 13a2.

Other embodiments of the locking feature and related locking structure are represented in FIG. 7. In the second embodiment from the top of FIG. 7, the locking feature is a tab 17a3 formed on and projecting axially towards the locking structure. The locking structure comprises two recesses consisting in notches formed in the periphery of the adjacent part 593 and disposed on diametrically opposite sides of the adjacent part 593. This latter embodiment reduces the bulk of the device in comparison with the embodiment represented in FIG. 5.

In two embodiments represented in the bottom of FIG. 7, the second element 13a4 comprises a recess 17a4 for receiving a radial projection 184 or 185 formed on the adjacent part 594 or 595. The recess 17a4 is formed on an axial protrusion, which protrusion is shaped so as to provide tangentially increasing and decreasing profile. Such profile allows appropriate introduction of the radial projection 184 or 185 formed on the adjacent part 594 or 595 for interlocking of said locking structure and said locking feature. The square-shape projection 184 of the adjacent part 594 leads to good repartition of the torque action of the device. The peak-shape projection 185 of the adjacent part 595 makes its fabrication easier.

Figure 8:
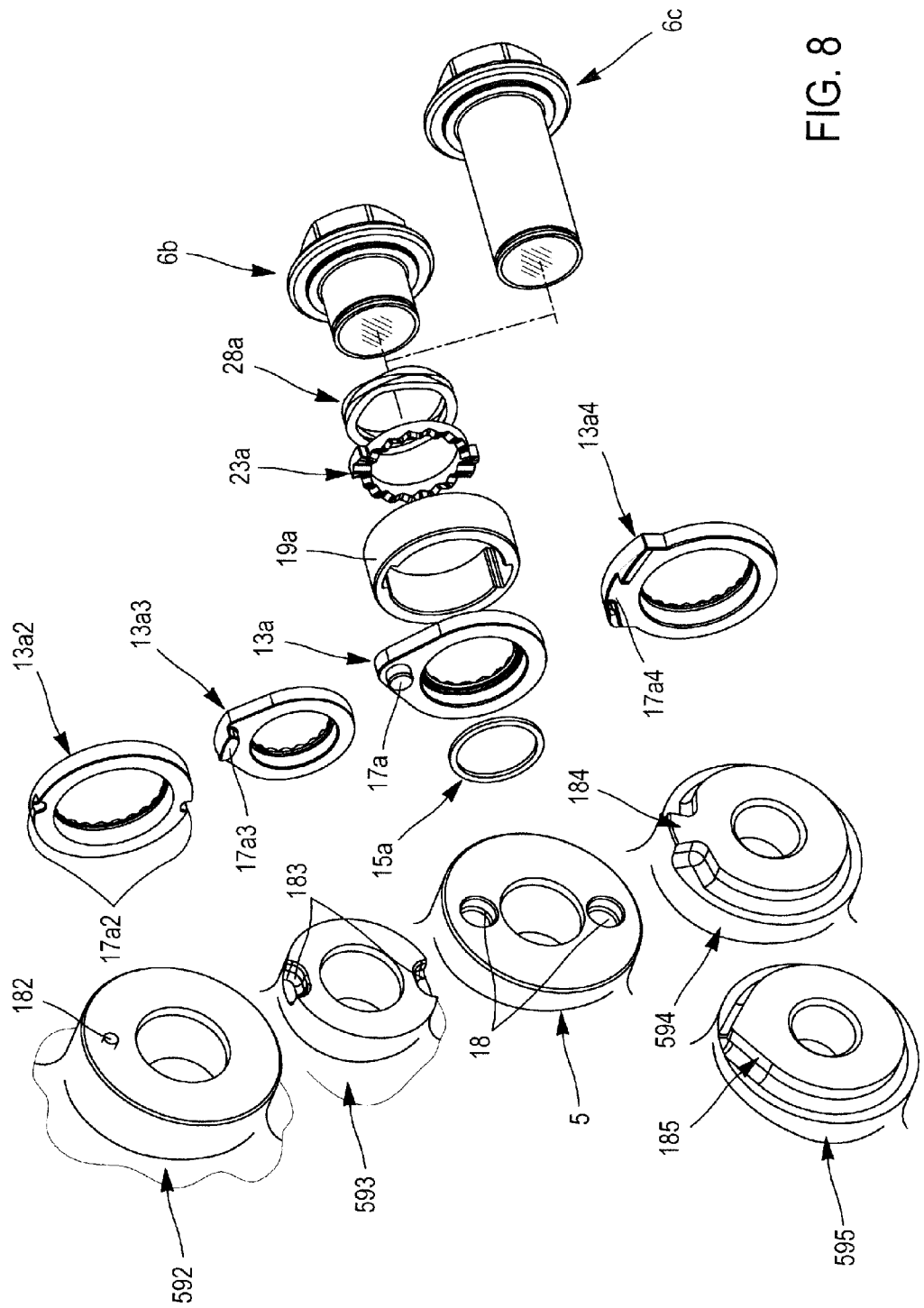
FIG. 8 is a view similar to FIG. 7, but with the device shown according to two embodiments, one being a screw and the other being a borescope plug.

Depending on the embodiment, the first element 6a, 6b, 6c could have either an inner thread (reference 6a in FIG. 7), or an outer thread (references 6b and 6c in FIG. 8). In addition, the first element 6a, 6b, 6c could either comprise a hollow body (reference 6a in FIG. 7) into which for instance the tip 3a is engaged, or have a closed end (references 6b and 6c in FIG. 8). In this latter case, the first element 6c is conceived to be engaged for instance into the adjacent part 5.

The following description considers the locking feature 17a and the locking structure 18 of FIGS. 1-5.

What is claimed is:

1. A unitary self-locking screwing attachment device for being part of an assembly having locking structure and for engaging a threaded member of said assembly, the attachment device comprising:

a first element having a threaded body for thread engagement with said threaded member during screwing and unscrewing towards and away from a tightened condition, respectively, wherein one of said threaded member or said threaded body is a male threaded element; and a lock in turn comprising:
a second element rotatably and captively supported onto said threaded body and provided with at least one locking feature to engage said locking structure and to form with the locking structure a self-hooking set, at least when said assembly is in or close to the tightened condition;
said second element including a through-bore sized to receive said male threaded element therethrough;
a stop member rotatably secured to the threaded body;
a releasable coupling means arranged for releasably coupling the stop member and the second element for common rotation;
spring means for resiliently activating said releasable coupling means;
wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold;
said locking feature positioned radially outwardly from said through-bore of said second element.

2. The device according to claim 1, wherein said locking structure has a shape which is at least partially conjugated with a shape of said at least one locking feature.

3. The device according to claim 1, wherein said at least one locking feature comprises at least one projection sized and shaped to be received into at least one recess of said locking structure.

4. The device according to claim 3, wherein said at least one projection comprises an at least partially cylindrical body.

5. The device according to claim 3, wherein said at least one projection comprises a radially extending protrusion relative to the screwing or unscrewing direction.

6. The device according to claim 3, wherein said at least one projection comprises a tangentially elongated protrusion relative to the screwing or unscrewing direction.

7. The device according to claim 1, wherein said at least one locking feature comprises at least one recess sized and shaped to receive a projection of said locking structure.

8. The device according to claim 7, wherein said at least one recess consists of at least one notch disposed on the periphery of said second element.

9. The device according to claim 8, wherein said notch is defined by an axial protrusion having sloped surfaces.

10. The device according to claim 1, wherein said at least one locking feature is disposed on a radially overhanging element shaped on the second element.

11. The device according to claim 1 being a nut.

12. The device according to claim 1 being a screw.

13. The device according to claim 1 being a plug having a male thread intended to be screwed into a bore for removably closing said bore.

14. The device according to claim 13, wherein the plug is a borescope plug.

15. An assembly comprising:
a sub-assembly having locking structure,
a unitary self-locking screwing attachment device for engaging a threaded member of said sub-assembly,
the attachment device comprising:
- a first element having a threaded body for thread engagement with said threaded member during screwing and unscrewing towards and away from a tightened condition, respectively, wherein one of said threaded member or said threaded body is a male threaded element; and
- a lock in turn comprising:
  - a second element rotatably and captively supported onto said threaded body and provided with at least one locking feature to engage said locking structure and to form with the locking structure a self-hooking set, at least when said assembly is in or close to the tightened condition;
  - said second element including a through-bore sized to receive said male threaded element therethrough;
  - a stop member rotatably secured to the threaded body;
a releasable coupling means arranged for releasably coupling the stop member and the second element for common rotation;
  spring means for resiliently activating said releasable coupling means;
  wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold;
  said locking feature positioned radially outwardly from said through-bore of said second element.

16. A unitary self-locking screwing attachment device for being part of an assembly having locking structure and for engaging a threaded member of said assembly, the attachment device comprising:
- a first element having a threaded body for thread engagement with said threaded member during screwing and unscrewing towards and away from a tightened condition, respectively; and
- a lock in turn comprising:
  - a second element rotatably and captively supported onto said threaded body and provided with at least one locking feature to engage said locking structure and to form with the locking structure a self-hooking set, at least when said assembly is in or close to the tightened condition;
  - a stop member rotatably secured to the threaded body;
  - a releasable coupling means arranged for releasably coupling the stop member and the second element for common rotation;
  - spring means for resiliently activating said releasable coupling means;
  - wherein said releasable coupling means and said spring means are configured and arranged to allow relative rotation of said stop member and said second element in a screwing direction when a torque applied to said device exceeds a predetermined screwing torque threshold and to allow relative rotation of said stop member and said second element in an unscrewing direction when an unscrewing torque applied to said device exceeds a predetermined unscrewing torque threshold;
  - wherein said at least one locking feature comprises at least one recess sized and shaped to receive a projection of said locking structure; and
  - wherein said at least one recess consists of two diametrically opposed recesses.

17. The assembly according to claim 15, wherein said locking structure and said at least one locking feature have a conjugated shape, at least partially.

18. The assembly according to claim 15, wherein at least one of said locking structure and said locking feature comprises at least one recess, and the other of said locking structure and said locking feature comprises at least one projection sized and shaped to be received into the at least one recess.

19. The assembly according to claim 18, wherein said at least one recess consists of two diametrically opposed recesses.

20. The assembly according to claim 18, wherein said at least one projection comprises an at least partially cylindrical body.

21. The assembly according to claim 18, wherein said at least one projection comprises a radially protrusion relative to the screwing or unscrewing direction.

22. The assembly according to claim 18, wherein said at least one projection comprises a tangentially elongated protrusion relative to the screwing or unscrewing direction.

23. The assembly according to claim 18, wherein said at least one recess consists of at least one notch disposed on the periphery of said assembly or said second element.

24. The assembly according to claim 23, wherein said notch is defined by an axial protrusion having sloped surfaces.

25. The assembly according to claim 15, wherein said at least one locking feature is disposed on a radially overhanging element shaped on the second element.

26. The assembly according to claim 15, wherein said assembly comprises a threaded shank and said unitary self-locking screwing attachment device is a nut.

27. The assembly according to claim 15, wherein said assembly comprises a threaded bore and said unitary self-locking screwing attachment device is a screw.

28. The assembly according to claim 15, wherein said assembly comprises a threaded bore and said unitary self-locking screwing attachment device is a plug adapted to removably close said threaded bore.

29. The assembly according to claim 26, wherein said assembly comprises a bore which bore is a borescope.

* * * * *